US012703187B2

(12) United States Patent
Olgac et al.

(10) Patent No.: US 12,703,187 B2
(45) Date of Patent: Aug. 11, 2026

(54) DEVICE FOR CONTROLLING A PRINTING TEMPERATURE OF AN INK IN A PRINT HEAD

(71) Applicant: Canon Production Printing Holding B.V., Venlo (NL)

(72) Inventors: Ender Olgac, Munich (DE); Matthias Kage, Haar (DE)

(73) Assignee: Canon Production Printing Holding B.V., Venlo (NL)

( * ) Notice: Subject to any disclaimer, the term of this patent is extended or adjusted under 35 U.S.C. 154(b) by 207 days.

(21) Appl. No.: 18/785,603

(22) Filed: Jul. 26, 2024

(65) Prior Publication Data

US 2025/0033371 A1 Jan. 30, 2025

(30) Foreign Application Priority Data

Jul. 27, 2023 (DE) ..................... 10 2023 119 969.2

(51) Int. Cl.
*B41J 2/175* (2006.01)
*B41J 2/17* (2006.01)
(Continued)

(52) U.S. Cl.
CPC ......... *B41J 2/17596* (2013.01); *B41J 2/1707* (2013.01); *B41J 2/18* (2013.01);
(Continued)

(58) Field of Classification Search
CPC ........ B41J 2/17596; B41J 2/1707; B41J 2/18; B41J 29/377; F24H 1/0072; F28D 9/0037;
(Continued)

(56) References Cited

U.S. PATENT DOCUMENTS 8,292,396 B2 * 10/2012 Yamada ................ B41J 29/377 347/17
2010/0066785 A1 3/2010 Yamada et al.
(Continued)

FOREIGN PATENT DOCUMENTS

CN 219171986 U 6/2023
DE 102021108545 A1 10/2022
(Continued)

*Primary Examiner* — Henok D Legesse
(74) *Attorney, Agent, or Firm* — The Webb Law Firm

(57) ABSTRACT

A device for controlling a printing temperature of an ink in a print head of a system for inkjet printing includes a heat exchanger with a first channel for ink and a second channel for a temperature control fluid; a chiller for heating and/or cooling the temperature control fluid; an ink circuit that is configured to pump ink through the heat exchanger and into the print head; and a temperature control fluid circuit that is configured to pump the temperature control fluid through the chiller and the heat exchanger. The device is configured to heat and/or cool the temperature control fluid with the chiller such that a temperature of the ink is set within a predetermined temperature range. At least one heating element is provided at the heat exchanger to heat the temperature control fluid and the ink to more rapidly set the ink within the predetermined temperature range.

15 Claims, 4 Drawing Sheets

(51) Int. Cl.

| | |
|---|---|
| ***B41J 2/18*** | (2006.01) |
| ***B41J 29/377*** | (2006.01) |
| ***F24H 1/00*** | (2022.01) |
| ***F28D 9/00*** | (2006.01) |
| ***H05B 3/36*** | (2006.01) |
| *F25B 13/00* | (2006.01) |

(52) U.S. Cl.
CPC .......... *B41J 29/377* (2013.01); *F24H 1/0072* (2013.01); *F28D 9/0037* (2013.01); *H05B 3/36* (2013.01); *F25B 13/00* (2013.01); *H05B 2203/013* (2013.01); *H05B 2203/021* (2013.01)

(58) Field of Classification Search
CPC ................ H05B 3/36; H05B 2203/013; H05B 2203/021; F25B 13/00
See application file for complete search history.

(56) References Cited

U.S. PATENT DOCUMENTS

| | | | | |
|---|---|---|---|---|
| 2013/0201243 | A1* | 8/2013 | Yoshida .................. | B41J 2/072 347/18 |
| 2016/0059565 | A1* | 3/2016 | Akiyama ................ | B41J 2/175 347/17 |
| 2019/0092017 | A1 | 3/2019 | Yamanaka et al. | |
| 2021/0023838 | A1* | 1/2021 | Saito ...................... | B41J 29/377 |
| 2021/0325119 | A1 | 10/2021 | Kajiya et al. | |
| 2023/0001689 | A1 | 1/2023 | Yu et al. | |

FOREIGN PATENT DOCUMENTS

| | | | |
|---|---|---|---|
| JP | H11008045 | A | 1/1999 |
| JP | 2015182291 | A | 10/2015 |
| JP | 2016179654 | A | 10/2016 |
| JP | 202261731 | A | 4/2022 |

* cited by examiner

DEVICE FOR CONTROLLING A PRINTING TEMPERATURE OF AN INK IN A PRINT HEAD

CROSS-REFERENCE TO RELATED APPLICATION

This application claims priority to German Patent Application No. 10 2023 119 969.2 filed Jul. 27, 2023, the disclosure of which is hereby incorporated by reference in its entirety.

BACKGROUND OF THE INVENTION

Field of the Invention

The invention relates to a device for controlling a printing temperature of an ink in a print head of a system for inkjet printing.

Description of Related Art

In the field of high-capacity printing, in particular given high resolutions of greater than 600 dpi as well as speeds in the cutting edge field, high-quality printouts must be generated with low ink consumption. The high requirements for the behavior of the ink can thereby only be achieved if the ink is held within a narrow, predetermined temperature range during the printing process. Empirically, the most advantageous ink properties can be achieved in a temperature range between 25 degrees Celsius and 38 degrees Celsius, in particular between 30 degrees Celsius and 34 degrees Celsius. Even small deviations of 1 degree Celsius from the ideal temperature can lead to performance losses. It is thus required to heat or also to cool the ink depending on the ambient temperature, the room temperature, and heating effects due to pump activity and electrical current. Since the room temperature of a room in which a system for inkjet printing is located is normally at most below 30 degrees Celsius, in such instances it is necessary to preheat ink that is located in an ink circuit.

US 2010/0066785 A1 discloses an inkjet printer that has a heat exchanger for heating and cooling the ink. This heat exchanger has channels for the different ink colors. The ink in the channels can be heated by means of a heater that is depicted as a plate in the illustrations and can be switched on and off. The heat exchanger furthermore has a radiant segment that, via pivoting, can be brought into a heat exchange with the channels. The radiant segment is provided with a large surface in order to cool the ink via thermal radiation to the environment. The cooling is intensified by an air flow that is configured to transport the heat away from the surface of the radiant segment. It is thereby disadvantageous that a cooling is no longer possible given an ambient or room temperature of above 34 degrees Celsius. Furthermore, the heater cannot be adjusted. Therefore, an activation duration and a deactivation duration of the heater must be very precisely dimensioned in order to truly achieve a maintenance of the ink within the narrow predetermined temperature range.

US 2019/0092017 A1 discloses an inkjet printer that has a heat exchanger for cooling and warming the ink. This heat exchanger has one or more ink channels and a temperature control channel. A temperature control fluid flows through the temperature control channel. This temperature control fluid can be cooled down in a chiller. Furthermore, this temperature control fluid can be warmed by the residual heat of integrated circuits that are used to drive the pump; however, for this a flow direction of the temperature control fluid must be reversed.

US 2021/0023838 A1 discloses an inkjet printer that has a heat exchanger for cooling and warming the ink. This has a heater (not specified in detail) and a cooler that, for example, can be a radiative cooler as in US 2010/0066785 A1.

SUMMARY OF THE INVENTION

The invention is based on the object of efficiently and precisely keeping the temperature of the ink within the predetermined temperature range, and decreasing a preheating time to put the ink into the predetermined temperature range if the temperature is markedly below the predetermined temperature range. This can be so especially after longer downtimes.

This object is achieved via a device for controlling a printing temperature of an ink in a print head of a system for inkjet printing as described herein.

The device according to the invention has a heat exchanger. This heat exchanger has a first channel for ink and a second channel for a temperature control fluid, in particular water. A chiller is provided to heat and/or cool the temperature control fluid. Furthermore, the device has an ink circuit that is configured to pump ink through the heat exchanger and the print head. Moreover, it has a temperature control fluid circuit that is configured to pump the temperature control fluid through the chiller and the heat exchanger. The device is configured to heat and/or cool the temperature control fluid by means of the chiller such that a temperature of the ink is set within a predetermined temperature range and is held therein. At the heat exchanger, at least one heating element is provided that is configured to additionally heat the temperature control fluid and the ink by means of an electrical current in order to more quickly set the ink into the predetermined temperature range.

In that the at least one heating element is located directly at the heat exchanger, the heating by the at least one heating element and the heating of the ink by the temperature control fluid occur at the same location. A more rapid heating of the ink and a good temperature control can thereby be linked with one another. Furthermore, it is a cost-effective solution, since both heating elements—in particular heating foils or heating mats—and heat exchangers are cost-effectively commercially available and can be simply installed with one another.

At least two heating elements are preferably provided. In this way, an additional heating can advantageously occur at different surface portions of the heat exchanger.

The at least one heating element is in particular designed as an electrically conductive coating on a substrate that is encapsulated in polyester film or silicone. This is a particularly cost-effective and commercially available variant of a heating element.

The heat exchanger is preferably designed as a plate heat exchanger. Such heat exchangers are advantageously commercially available, simple to manufacture, and a heating element can be simply attached to them, in particular if it is designed as a heating foil or heating mat. Plate heat exchangers typically have metal plates that are fashioned in layers. These metal plates can be soldered with or screwed to one another, for example. They consist, for the most part, of especially heat-conductive, robust, and corrosion-resistant stainless steel. For example, interstices in which a heat exchange occurs can be achieved via a wavy pattern of the metal plates.

It is particularly preferred if a flow direction of the temperature control fluid and a flow direction of the ink are transversely orthogonal to one another. Cross-flow is particularly preferred if it is desired to achieve a fixed temperature, which, with regard to controlling the temperature of the ink, especially corresponds to the object of the invention.

However, it is also conceivable that the flow direction of the temperature control fluid and the flow direction of the ink are concurrent with one another, or travel in opposite directions. The greatest conceivable heat exchange occurs given opposite flow directions.

In a particularly advantageous embodiment, the heat exchanger is insulated externally. This is advantageous, since in this way a thermal conductivity to the outside is effectively restricted. The predetermined temperature range of the ink can thus be better achieved and maintained. The insulation is thereby preferably designed so that it can be opened. The at least one heating element can in this way advantageously be installed within the insulation.

A first heating element is preferably installed in a first direction on an outermost metal plate of the plate heat exchanger. A second heating element is particularly preferably installed in a second direction on an outermost metal plate of the plate heat exchanger. A particularly good thermal transfer can advantageously be achieved in this way. In a particularly advantageous embodiment, the first and/or second heating element spans at least 80 percent of the surface of the outermost metal plate. The thermal transfer can be further improved in this way.

It is conceivable that the at least one heating element is glued and/or clamped and/or screwed together with the heat exchanger. This is to be understood as non-limiting.

The insulation of the heat exchanger preferably has a bore for a power supply of the at least one heating element. This is advantageous for controlling the at least one heating element.

The chiller can preferably be operated both in a cooling mode and in a heating mode. A temperature of the temperature control fluid can in this way be very precisely controlled and/or regulated.

In an advantageous embodiment, the temperature control fluid circuit is furthermore configured to pump through the print head. A control of the temperature of the ink at the print head can in this way take place with greater precision. This is necessary primarily since heat escapes at the print head during the printing process. If the temperature of the ink after passing through the heat exchanger is within the predetermined range, it can be heated to above the predetermined range upon passing through the print head. The temperature control fluid can thus provide for further cooling here.

In order to be able to react even better to a heating of the print head, the device preferably has a valve that is configured to, in a first position, conduct the temperature control fluid through the heat exchanger and to, in a second position, conduct the temperature control fluid past the heat exchanger. This is advantageous in particular in a cooling mode in order to more quickly counteract a heating of the print head during a printing process, in that the temperature control fluid is not yet conducted through the heat exchanger but rather past it, and in this way can produce a stronger cooling effect in the print head.

The ink circuit preferably has a buffer tank that is filled in part with air, or another gas, and in part with ink. This allows a good control of pressure and temperature of the ink. A branch line of the ink circuit leads in particular from the buffer tank to the print head. The ink is thus advantageously conducted to the print head due to the pressure in the buffer tank. An ink sub-circuit preferably leads from the buffer tank, through a pump, through the heat exchanger, and back again to the buffer tank. This sub-circuit advantageously serves to heat and/or to cool the ink in the buffer tank via the heat exchanger. In particular, in the ink sub-circuit a valve is provided that is configured to conduct the ink either through the heat exchanger or past the heat exchanger. If the ink is directed past the heat exchanger, a heat exchanger effect at the print head can in this way be strengthened, which is especially advantageous in the cooling mode.

Further advantageous embodiments result from the following drawings and from the detailed Figure description.

DESCRIPTION OF THE INVENTION

Figure 1:
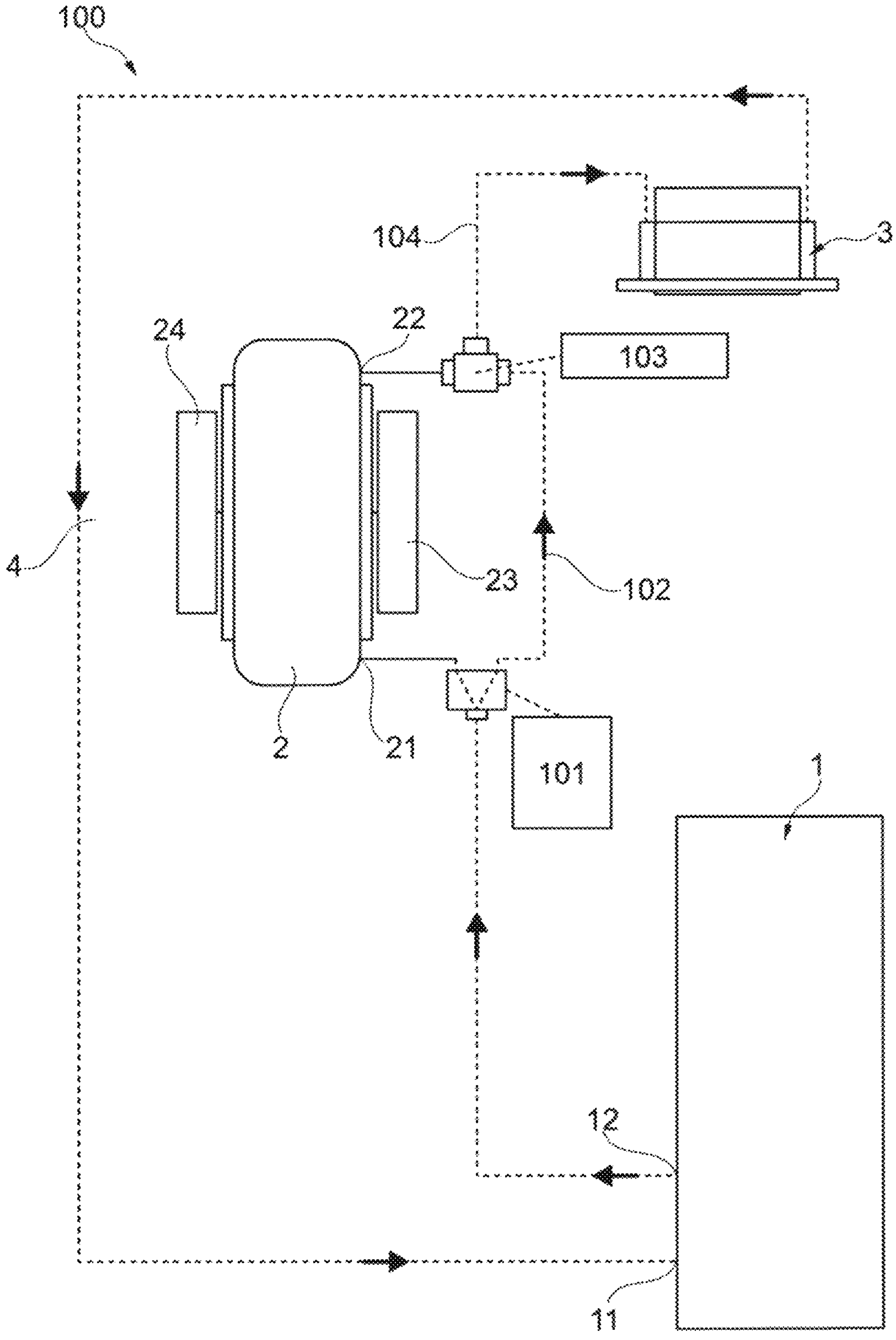
FIG. 1 schematically shows a flow diagram of a temperature control fluid circuit of a preferred embodiment of the device according to the invention.

In FIG. 1, a temperature control fluid circuit of a preferred embodiment of a device according to the invention is schematically depicted and designated with 100 in a flow diagram. This temperature control fluid circuit 100 is configured to pump a temperature control fluid 4 through a chiller 1, through a plate heat exchanger 2, and through a print head 3.

The chiller 1 is configured to heat and/or to cool the temperature control fluid 4. For example, this can be configured as a refrigeration machine, or heat pump, or compression refrigerating plant or heating plant, to supply or remove heat from the temperature control fluid via a thermodynamic cycle. A design with Peltier element(s), or other known systems for heating and/or cooling of fluids, are also conceivable. The chiller 1 has an infeed 11 of temperature control fluid 4 and an outfeed 12 of temperature control fluid 4. The temperature control fluid circuit 100 is configured to supply the temperature control fluid 4 to the chiller 1 via the infeed 11, and to discharge the heated or cooled temperature control fluid 4 via the outfeed 12.

In this embodiment, a first Roman valve 101 is provided downstream of the outfeed 12 of the chiller 1. The first Roman valve 101 is configured either to supply the temperature control fluid 4 from the chiller 1 to the plate heat exchanger 2, or to direct the temperature control fluid 4 past the plate heat exchanger 2 in a first bypass 102.

The plate heat exchanger 2 is provided to heat or cool ink in an ink circuit by means of the temperature control fluid 4. However, this occurs only if the first Roman valve 101 is set up so that the discharged temperature control fluid 4 is supplied from the chiller 4 to the plate heat exchanger 2. For this, the plate heat exchanger 2 has an infeed 21 and an outfeed 22. In this embodiment, these are arranged on a common surface, without limiting generality. The plate heat exchanger has a first heating element 23 and a second heating element 24. The first heating element 23 is arranged at a surface of the plate heat exchanger 2, said surface facing toward the infeed 21 and the outfeed 22. The second heating element 24 is arranged on a surface of the plate heat exchanger, said surface facing away from the infeed 21 and the outfeed 22. Additional preferred features of the plate heat exchanger 2 are described further below with reference to FIGS. 3-5.

In this embodiment, a T-connector 103 is arranged downstream of the plate heat exchanger. The T-connector 103 is configured to transport temperature control fluid 4 that comes from the outfeed 22 of the plate heat exchanger 2, and temperature control fluid 4 that comes from the first bypass 102, into a common temperature control fluid flow 104. In this way, it is achieved that the T-connector 103 carries either temperature control fluid from the plate heat exchanger 2 or temperature control fluid 4 from the first bypass 102, depending on the position of the first Roman valve 101.

The temperature control fluid flow 104 from the T-connector 103 is configured to be conducted into the print head 3. In this embodiment, a heating and/or cooling of the ink additionally occurs here. This has advantages especially if the temperature of the ink in the print head rises due to a printing process. In this event, the chiller can be switched into the cooling mode. Furthermore, the first Roman valve 101 can be set so that the temperature control fluid 4 flows from the outflow 12 of the chiller into the first bypass 102; thus, no heating occurs in the plate heat exchanger 4, and the full cooling effect of the temperature control fluid 4 occurs directly at the print head 3. A very rapid reaction to a heating of the print head is thus possible. In this embodiment, the temperature control fluid 4 downstream of the print head flows directly into the intake 11 of the chiller 1 again.

Figure 2:
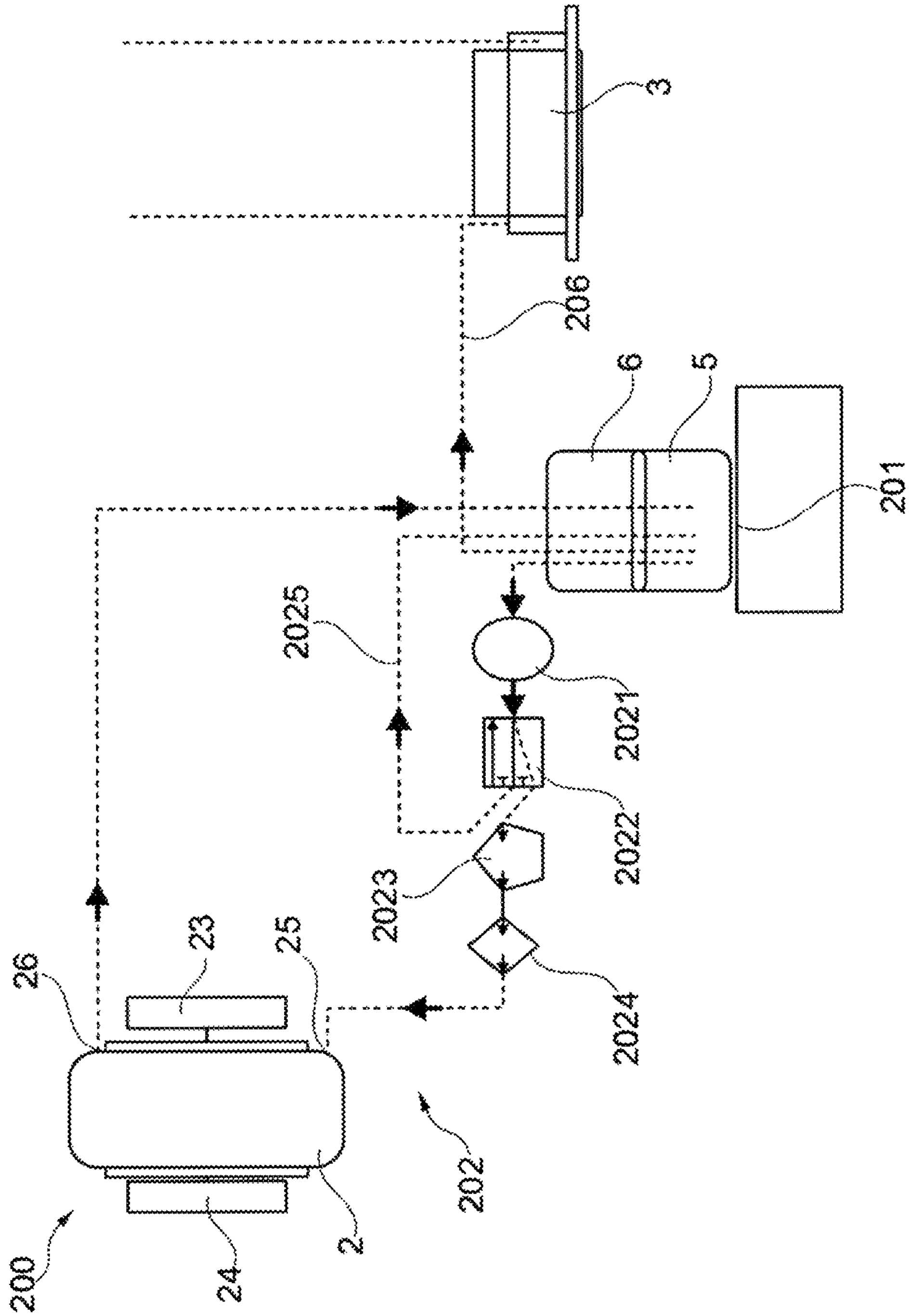
FIG. 2 schematically shows a flow diagram of an ink circuit of a preferred embodiment of the device according to the invention.

An ink circuit of a preferred embodiment of a device according to the invention is schematically depicted and designated with 200 in a flow diagram in FIG. 2. This ink circuit 100 has a buffer tank 201. This buffer tank 201 is filled partially with ink 5 and partially with air 6. An overpressure in the buffer tank 201 can in this way be adjusted very well. A branch line 206 leads from the buffer tank 201 to the print head 3.

In this embodiment, a sub-circuit 202 of the ink circuit 200 is configured to pump ink 5 through a plate heat exchanger 2 by means of a pump 2021, and to conduct said ink 5 back again into the buffer tank 201. The plate heat exchanger 2 is thereby designed to cool or heat the ink 5 conducted through it by means of a temperature control fluid 4. The temperature of the ink 5 in the buffer tank can be controlled in this way. An example of a temperature control fluid circuit 100 is described above with reference to FIG. 1. The pump is hereby arranged downstream of the buffer tank 201. A second Roman valve 2022 is hereby arranged downstream of the pump. The second Roman valve is hereby designed to, in a first position, pass the ink 5 through to the plate heat exchanger 2 and to, in a second position, conduct the ink 5 back to the buffer tank 201 in a second bypass 2025. In the event that the second Roman valve 2022 is in the first position, a 5 μm filter 2023 is downstream of the second Roman valve 2022. A degasser 2024 is downstream of the 5 μm filter 2023. In this way, it can be ensured that no clumps or gas bubbles arrive in the plate heat exchanger 2. Gas bubbles could reduce the thermal conductivity, and clumps could clog the plate heat exchanger 2. The plate heat exchanger 2 is downstream of the 5 μm filter 2023. The ink is conducted from an ink outflow of the plate heat exchanger 2 back to buffer tank 201.

Figure 3:
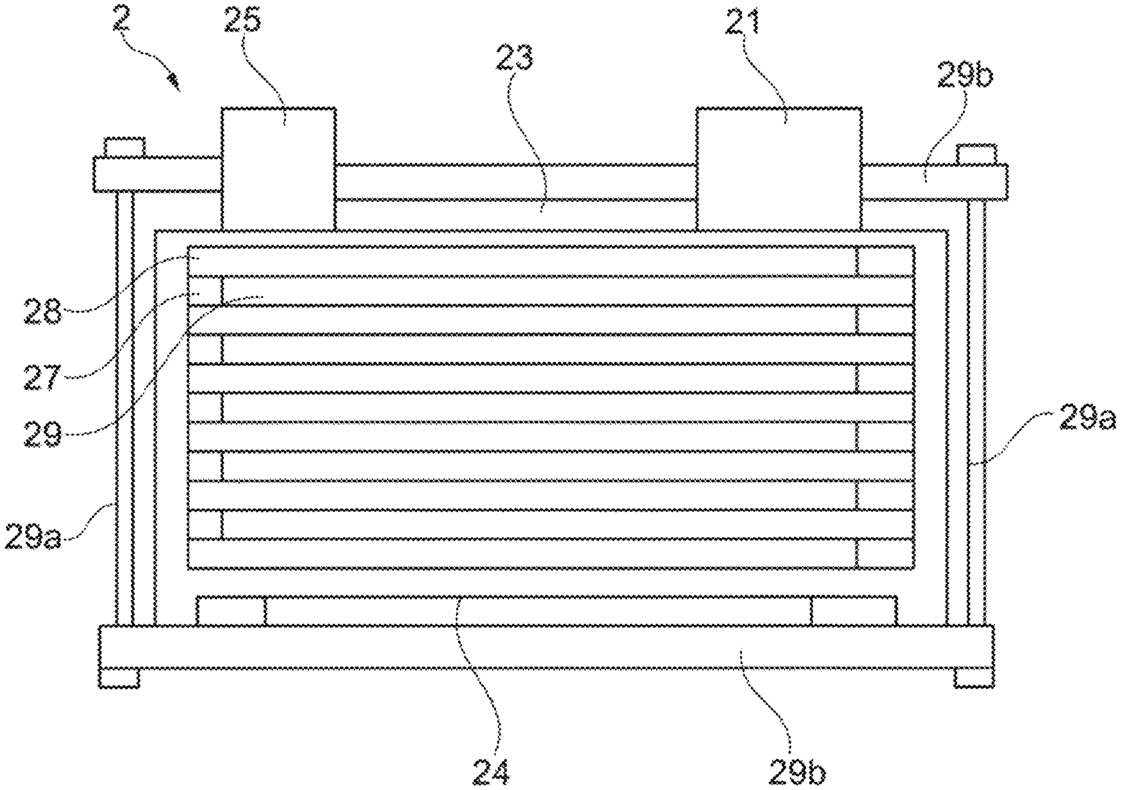
FIG. 3 shows a schematic vertical/horizontal section view of a plate heat exchanger having two heating elements, according to a preferred embodiment of the device according to the invention.
Figure 4:
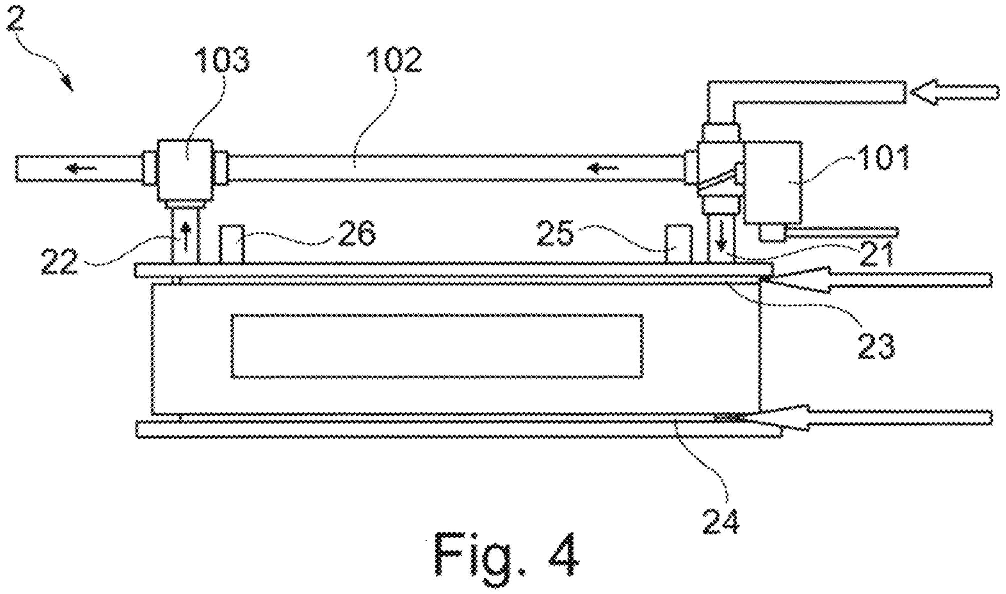
FIG. 4 shows a further schematic vertical/horizontal section view of the plate heat exchanger from FIG. 3.
Figure 5:
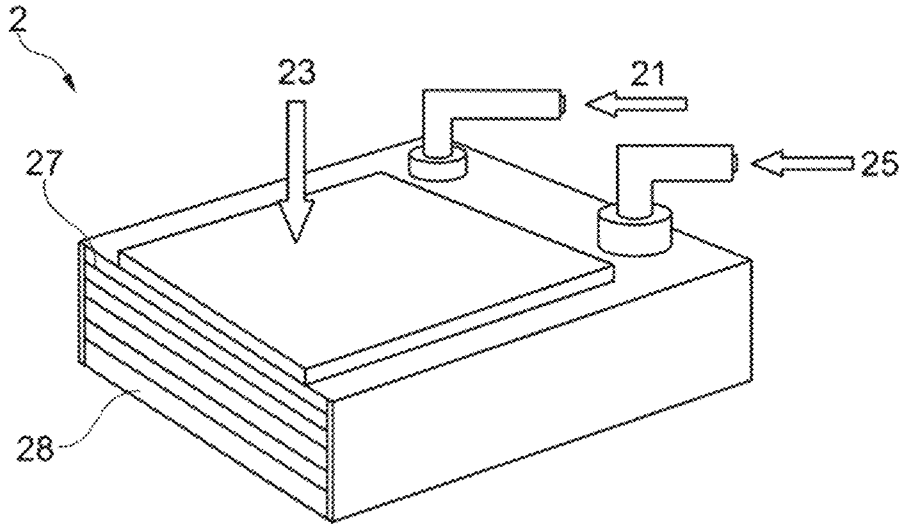
FIG. 5 shows a perspective view of the plate heat exchanger from FIGS. 3 and 4.

A plate heat exchanger from a preferred embodiment of a device according to the invention is depicted in two section views and one perspective view, and designated with 2, in FIG. 3 through 5.

The plate heat exchanger 2 has an ink infeed 25 and a temperature control fluid infeed 21. Furthermore, the plate heat exchanger 2 has an ink outfeed 26 and a temperature control fluid outfeed 22. An example of a temperature control fluid circuit 100 is described above with reference to FIG. 1. An example of an ink circuit 200 is described above with reference to FIG. 2. The plate heat exchanger 2 has metal plates 27 that are fashioned in layers and form interstices or chambers. An ink control fluid chamber 28 and a respective ink chamber 29 are hereby respectively arranged in alternating succession. Six ink control fluid chambers 28 and five ink chambers 29 are depicted in this way in FIG. 3. The plate heat exchanger is particularly advantageously designed to vary the volume via the addition of additional metal plates 27 and chambers.

A first heating element 23 is arranged at a first end of the plate heat exchanger 2. A second heating element 24 is arranged at a second end of the plate heat exchanger 2. The plate heat exchanger 2 terminates at both ends with a respective mounting plate 29*b*. In this embodiment, the outer mounting plates 29*b* are linked by means of screw connectors 29*a*. In this way, the chambers of the plate heat exchanger 2 can advantageously be held tightly, wherein a variation of a volume of the plate heat exchanger is easily possible in that additional metal plates 27 can be slid in-between and sealed by means of the screw connectors 29*a* and mounting plates 29*b*.

The first heating element 23 and the second heating element 24 here are fashioned as heating foils, and respectively span more than 80% of a surface of the outer metal plates of the heat exchanger. In this way, an especially good additional heat emission can be achieved. In particular, a thermal output of the heating foils can be modified via a variation of the voltage.

In the section view of FIG. 4, the arrangement of the first Roman valve 101, the bypass 102, and the T-connector 103 from FIG. 1 is depicted above the plate heat exchanger 2. Whether the temperature control fluid 4 is conducted from the chiller 1 (see FIG. 1) through the plate heat exchanger 2 or through the bypass 102 can advantageously be set by means of the first Roman valve 101.

In particular, a device according to the invention is provided for every ink color. A rapid and cost-effective setting of ink 5 within a predetermined printing temperature range can be achieved via the measures described in this document. Furthermore, a very precise and cost-effective maintenance of the printing temperature of the ink 5 within this predetermined range can be achieved. Moreover, a good adaptability to and variability of different ink volumes can be achieved.

REFERENCE LIST

1 chiller
2 plate heat exchanger
3 print head
4 temperature control fluid

5 ink
6 air
11 infeed of the temperature control fluid to the chiller
12 outfeed of the temperature control fluid from the chiller
21 temperature control fluid infeed for the plate heat exchanger
22 temperature control fluid outfeed for the plate heat exchanger
23 first heating element
24 second heating element
25 ink infeed for the plate heat exchanger
26 ink outfeed for the plate heat exchanger
27 metal plate
28 ink control fluid chamber
29 ink chamber
29*a* mounting plate
29*b* screw for mounting plate
100 temperature control fluid circuit
101 first Roman valve
102 first bypass
103 T-connector
104 temperature control fluid flow
200 ink circuit
201 buffer tank
202 ink sub-circuit
206 branch line
2021 pump
2022 second Roman valve
2023 5 μm filter
2024 degasser
2025 second bypass

The invention claimed is:

1. A device for controlling a printing temperature of an ink in a print head of a system for inkjet printing, the device comprising:

a heat exchanger comprising:
a first channel for ink; and
a second channel for a temperature control fluid;
a chiller for heating and/or cooling the temperature control fluid;
an ink circuit that is configured to pump ink through the heat exchanger and into the print head; and
a temperature control fluid circuit that is configured to pump the temperature control fluid through the chiller and the heat exchanger,
wherein the device is configured to heat and/or cool the temperature control fluid with the chiller such that a temperature of the ink is set within a predetermined temperature range and held therein;
wherein at least one heating element is provided at the heat exchanger, which at least one heating element is configured to additionally heat the temperature control fluid and the ink with an electric current in order to more rapidly set the ink within the predetermined temperature range.

2. The device according to claim 1, wherein at least two heating elements are provided.

3. The device according to claim 1, wherein the at least one heating element is designed as a heating foil, in particular as an electrically conductive coating on a substrate that is encapsulated in polyester film or silicone.

4. The device according to claim 3, wherein the heating foil is an electrically conductive coating on a substrate that is encapsulated in polyester film or silicone.

5. The device according to claim 1, wherein the heat exchanger is a plate heat exchanger.

6. The device according to claim 5, wherein the plate heat exchanger comprises metal plates of stainless steel.

7. The device according to claim 5, wherein a first heating element is installed in a first direction on an outermost metal plate of the plate heat exchanger, and a second heating element is installed in a second direction on an outermost metal plate of the plate heat exchanger.

8. The device according to claim 7, wherein the first heating element and/or the second heating element spans at least 80 percent of a surface of the outermost metal plate.

9. The device according to claim 1, wherein the heat exchanger is insulated externally.

10. The device according to claim 1, wherein the chiller can be operated both in a cooling mode and in a heating mode.

11. The device according to claim 1, wherein the temperature control fluid circuit is configured to additionally pump the temperature control fluid through the print head.

12. The device according to claim 1, wherein the temperature control fluid circuit has a valve that is configured to, in a first position, conduct the temperature control fluid through the heat exchanger and to, in a second position, direct the temperature control fluid past the heat exchanger.

13. The device according to claim 12, wherein the valve is a first Roman valve.

14. The device according to claim 1, wherein the ink circuit has a buffer tank that is filled partially with air, or another gas, and partially with ink.

15. The device according to claim 14, wherein a branch line of the ink circuit leads from the buffer tank to the print head.

* * * * *